(12) United States Patent
Hamadi et al.

(10) Patent No.: US 7,472,094 B2
(45) Date of Patent: Dec. 30, 2008

(54) MULTI-ORDERED DISTRIBUTED CONSTRAINT SEARCH

(75) Inventors: Youssef Hamadi, Cambridge (GB); Georg Ringwelski, Goerlitz (DE)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 11/192,556

(22) Filed: Jul. 28, 2005

(65) Prior Publication Data

US 2007/0094174 A1    Apr. 26, 2007

(51) Int. Cl.
*G06N 5/00* (2006.01)
(52) U.S. Cl. .......................................... 706/19; 706/45
(58) Field of Classification Search ................ 706/19, 706/14, 10; 707/10, 2, 3, 205; 718/102; 716/7
See application file for complete search history.

(56) References Cited

U.S. PATENT DOCUMENTS

| | | | | |
|---|---|---|---|---|
| 5,504,837 | A * | 4/1996 | Griffeth et al. ................. 706/10 |
| 5,625,811 | A * | 4/1997 | Bhide et al. ..................... 707/2 |
| 5,675,791 | A * | 10/1997 | Bhide et al. ................. 707/205 |
| 6,086,628 | A * | 7/2000 | Dave et al. ....................... 716/7 |
| 6,529,934 | B1 * | 3/2003 | Kawamura et al. .......... 718/102 |
| 6,778,987 | B1 * | 8/2004 | Wynblatt et al. ............... 707/10 |
| 6,862,594 | B1 | 3/2005 | Saulpaugh et al. |
| 6,865,562 | B2 * | 3/2005 | Fromherz et al. ............. 706/14 |
| 7,031,956 | B1 * | 4/2006 | Lee et al. ......................... 707/3 |
| 2003/0036963 | A1 | 2/2003 | Jacobson et al. |
| 2003/0144975 | A1 | 7/2003 | Kawamura et al. |
| 2003/0182272 | A1 | 9/2003 | Leung et al. |
| 2004/0068462 | A1 | 4/2004 | Katz et al. |
| 2004/0243366 | A1 | 12/2004 | Kauffman et al. |
| 2004/0249795 | A1 | 12/2004 | Brockway et al. |
| 2005/0055329 | A1 | 3/2005 | Bakalash et al. |
| 2005/0075999 | A1 | 4/2005 | Kojima et al. |

(Continued)

FOREIGN PATENT DOCUMENTS

EP    0 698 331 B1    7/1997

(Continued)

OTHER PUBLICATIONS

Weixiong Zhang, et al, "An Analysis and Application of Distributed Constraint Satisfaction and Optimization Algorithms in Sensor Networks", AAMAS'03, Jul. 2003, Melbourne.

(Continued)

*Primary Examiner*—Wilbert L Starks, Jr.

(57) ABSTRACT

A node participating in a network of nodes that solve a distributed constraint problem. The nodes have mutually constrained sub-problems of the constraint problem. The node receives values or decisions from neighbor nodes. Those values or decisions allow the sub-problems of the neighbor nodes to be solved. Some received values or decisions correspond to a first ordering of the nodes, and some received values or decisions correspond to a second ordering of the nodes. Attempts are made to solve the sub-problem of the node as constrained by the values or decisions of the neighbor nodes. Results of the attempts are communicated to neighbor nodes, where for a given value or decision the node to which the corresponding attempt result is communicated depends on which of the orderings the given value or decision corresponds to. An attempt for one context can be affected by attempts in another context.

20 Claims, 7 Drawing Sheets

U.S. PATENT DOCUMENTS

| | | |
|---|---|---|
| 2005/0108036 A1 | 5/2005 | Andreoli et al. |
| 2005/0138025 A1 | 6/2005 | Yamada et al. |
| 2005/0149496 A1 | 7/2005 | Mukherjee et al. |

FOREIGN PATENT DOCUMENTS

| | | |
|---|---|---|
| EP | 1 531 412 A2 | 5/2005 |
| WO | WO 94/27411 | 11/1994 |
| WO | WO 2004/029841 A2 | 4/2004 |
| WO | WO 2005/033971 A1 | 4/2005 |

OTHER PUBLICATIONS

Roie Zivan, Amnon Meisels "Concurrent Dynamic Backtracking for Distributed CSPs", Ben'Gurion University of the Negev, Beer-Sheva, 84-105, Israel.

Bhaskar Krishnamachari, et al "Distributed Constraint Satisfaction and the Bounds on Resource Allocation in Wireless Networks", Cornell University, Ithaca, New York.

Pragnesh Jay Modi, et al "An Asynchronous Complete Method for General Distributed Constraint Optimization", University of Southern California, Marina del Ray, USA.

Lingzhong Zhou, et al, "Dynamic Agent Ordering in Distributed Constraint Satisfaction Problems", Griffith University Gold Coasd, Australia.

Youssef Hamadi "Interleaved Backtracking in Distributed Constraint Networks", International Journal on Artificial Intelligence Tools, 2002, p. 167-188, vol. 11, No. 2.

Yousef Hamadi "Optimal Distributed Arc-Consistency", Constraints 7, 2002, 367-385, Kluwer Academic Publishers, Netherlands.

Chris Brooks "Distributed Software Development. Problem Solving II", University of San-Francisco.

Chris Ray "Distributed Constraint Satisfaction Problems", 2005.

Makoto Yokoo, et al, "The Distributed Constraint Satisfaction Problem: Formalization and Algorithms", IEEE Transactions on Knowledge and Data Engineering, 1998,vol. 10, No. 5.

Jennifer Wong, Miodrag Potkonjak "Search in Sensor Networks", ICASSP, 2002.

Georg Ringwelski, Youssef Hamadi "Multi-Directional Distributed Search with Aggregation", Technical Report, Microsoft Research, 2005.

Jan Mischke, Burkhard Stiller "Peer-to-Peer and Distributed Search in Fixed and Mobil Environments", Hawaii International Conference on System Sciences, 2004.

Javed Aslam, et al, "MetaSearch: Data Fusion and Distributed Retrieval", Draft, 2002.

Pragnesh Jay Modi, et al "A Dynamic Constraint Satisfaction Approach to Resource Allocation", University of Southern California, Marina del Rey, USA.

* cited by examiner

MULTI-ORDERED DISTRIBUTED CONSTRAINT SEARCH

BACKGROUND

Systems of simultaneous equations, systems of interrelated logic sentences, and other problems that involve interrelated or inter-constrained sub-problems can often be solved with known straightforward techniques, provided that the problem can be centralized or that the solution is under the control of one entity. However, multi-part problems can be difficult to solve when different entities, decision makers, computers, nodes, processors, agents, robots, etc. each control different sub-problems or sub-parts of a global problem. These distributed problems are sometimes referred to as distributed constraint satisfaction problems, distributed constraint optimization problems, or more generally distributed constraint problems. Distributed constraint problems are often distributed because of real world circumstances. Consider some examples.

A group of robots may need to work together to perform a task such as gathering and arranging the disparate parts needed for a mechanical assembly. Each robot may need to decide which part to pick up based on local considerations such as location, ability to grasp a type of part, etc. Yet each robot's decision will need to comport with the decisions of other robots. For example, one robot should not try to move toward a part if another robot has decided to pick up that part. The robots need to make individual decisions that satisfy the constraints of other robot's decisions, yet those individual decisions must together solve the global problem, in this case gathering and arranging of the needed parts.

Finding a time that satisfies multiple different schedules is another example of a distributed constraint problem. Suppose that a commonly available time must be found for different schedules A, B, and C. However, due to communication barriers or privacy considerations, A, B, and C may not be able to share their respective schedules. Therefore, A proposes various times, say to B, until B replies with agreement. When B agrees, B proposes the time to C, if C agrees then a global solution is found. Each may also have various local individual requirements. For example, to meet with A, B may need to meet in a location that is only available at certain times.

Distributed decision making is another example of a distributed constraint problem. For example, a new vehicle's specifications may need to be determined by a command structure that has an engineering department, a design department, and a marketing department. A department makes an individual decision about the specifications of the vehicle that satisfies that department's constraints about the vehicle. At the same time, depending on the relative priorities of the different departments, each department's decision constrains (or is constrained by) the decision of another department.

There are many other examples of distributed constraint problems. For example, coordination in sensor networks, handling of telephone calls by pieces of telecommunication equipment, and so on. In the case of sensor coordination, the sensors may have overlapping areas that they can sense and the sensors may need to decide amongst themselves which sensors will cover which areas. In sum, the types of problems mentioned above are naturally decentralized or distributed due to factors such as autonomy, privacy, communication, etc.

Distributed constraint problems can be solved using various known modeling and search techniques. FIG. 1 shows how a distributed constraint problem can be modeled. In FIG. 1, each node 50 is assumed to be able to communicate with other nodes using a communication medium 52, for example a data communication network, a system bus, a wireless telephony network, etc. Each node 50 corresponds to or resides within some autonomous entity, agent, device, etc. Each node 50 is responsible for finding some corresponding sub-part of a global solution. That is, each node 50 has some calculation or decision that it must make, as constrained by or constrained to the decision or calculation of another node 50. The local solutions of the various nodes 50 together form the global solution. In FIG. 1, inter-node constraints 54 are shown as lines connecting the nodes 50. For example, in the vehicle specification scenario mentioned above, node1 may be the engineering department and may be responsible for determining engine power, node2 may be the design department and may be responsible for determining hood size, and node3 may be the marketing department that determines the style of the hood. Each may constrain or be constrained by decisions of another.

A node may be responsible for determining multiple parameters of the global problem. In FIG. 1, node1 is responsible for determining values for variables $x1$, $y1$, and $z1$; node2 is responsible for determining values for variables $x2$, $y2$, and $z2$; node 3 is responsible for determining values for variables $x3$ and $y3$; and so on. Each node has at least one variable whose value is constrained by the value of another node's variable. In the example shown in FIG. 1, variables $x1$ and $x2$ have a constraint 56 that their values must be equal. Variables $x2$ and $y3$ have a constraint 58 that their values must be unequal. Other nodes also have variables and inter-node constraints. Each node may also have internal constraints that their local solution must satisfy. For example, node2 may require that $y2$ have a value of 1, 2, or 3 and be equal to $z2$. A global solution will meet the internal or private constraints or requirements of each node and all of the inter-node constraints.

FIG. 2 shows a technique for searching nodes to solve a distributed constraint problem. Usually, any ordering or prioritization can be used to find some solution. The arrows connecting nodes in FIG. 2 represent a possible ordering of the constraints 54 shown in FIG. 1. In FIG. 2, the nodes 50 are given an ordering by priority; node1 has highest priority, and node9 has lowest priority. Searching is one technique for finding a solution to a distributed constraint problem. Searching requires an order be given to the different nodes. Often, the most constrained node will be given the highest priority.

A search proceeds by the highest priority node first making a decision or calculation. In FIG. 2, node1 initiates the search with an initial decision process 70 of making 72 a decision or determination that satisfies node1's internal requirements and then forwarding 74 the decision or determination (e.g., a value of a variable) to the other nodes next in priority, in this case, node2, node3, and node4. The nodes below node1 perform a constrained decision or determination process 76, comprising receiving 78 a decision from a next-highest priority node (a parent node) and making 80 a local decision or determination constrained by the received 78 decision or determination. If a decision is made 80, then that decision is forwarded 74/82 to the node's lower priority neighbors (children neighbors). If a decision or determination is not possible, that is, the node is unable to satisfy its internal constraints while following the received 78 decision or determination, then the node backtracks the overall decision making process by informing the node that sent the received 78 decision or determination that such decision or determination is not acceptable. Backtracking is a well known approach for searching distributed constraints and further explanation may be found elsewhere. The overall affect of the search approach is that the nodes cooperate to find a solution to a distributed constraint problem.

In the field of distributed constraints, the search process described above is often called synchronous searching. With synchronous searching, one node awaits the result from another node. However, asynchronous searching can be used as well. With asynchronous searching, a node searches for a local solution (and propagates it to lower priority nodes) even if it is not yet informed of some parent decision.

Returning to the vehicle specification consensus example, the departments may be prioritized so that the decision or output of the engineering department has highest priority, the output of the design department is next in priority, and the marketing department has the next priority. If prioritized as above, when the engineering department outputs a specification for the engine, the design department must abide by the engine specification when determining a body design. When the design department outputs a body design the marketing department must determine a marketing plan that respects the body design. Each node must respect the output or decision of the node above it. If the order is changed then the global solution may also change. If for some reason the design department cannot find a local solution or decision that will agree with the engineering department, the search will backtrack to that department, in effect telling the engineering department it must change its current solution. In practice, each department may be represented by a corresponding node, such as a computer or an autonomous network agent, perhaps implemented using the Agent Communication Language (ACL).

Previous search algorithms for solving distributed constraint problems have relied on adaptations such as backtracking, local reprioritization (sometimes called weak commitment searching), centralized control, etc. However, fast and reliable solutions have been elusive. There is a need to efficiently solve distributed constraint problems.

SUMMARY

The following summary is included only to introduce some concepts discussed in the Detailed Description below. This summary is not comprehensive and is not intended to delineate the scope of protectable subject matter, which is set forth by the claims presented at the end.

A node participates in a network of nodes that solve a distributed constraint problem. The nodes have mutually constrained sub-problems of the constraint problem. The node receives values or decisions from neighbor nodes. Those values or decisions allow the sub-problems of the neighbor nodes to be solved. Some received values or decisions correspond to a first ordering of the nodes, and some received values or decisions correspond to a second ordering of the nodes. Attempts are made to solve the sub-problem of the node as constrained by the values or decisions of the neighbor nodes. Results of the attempts are communicated to neighbor nodes, where for a given value or decision the node to which the corresponding attempt result is communicated depends on which of the orderings the given value or decision corresponds to. An attempt for one context can be affected by attempts in another context.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

As discussed below, solutions to distributed constraint problems can be found using a number of new techniques. It has been presently observed that the time for completing a distributed constraint search is sometimes sensitive to even minor variations in the initial ordering of the participating nodes; the reordering of even a single node can sometimes have a significant impact on the number of backtracks that occur and the overhead that is incurred. A technique discussed below involves using multiple concurrent searches of respective different orderings of nodes of a distributed constraint problem to find a solution to the same distributed constraint problem. Another technique discussed below involves using information about one concurrent search to inform or affect the conduct of another concurrent search. These techniques and their variations are discussed below.

Figure 1:
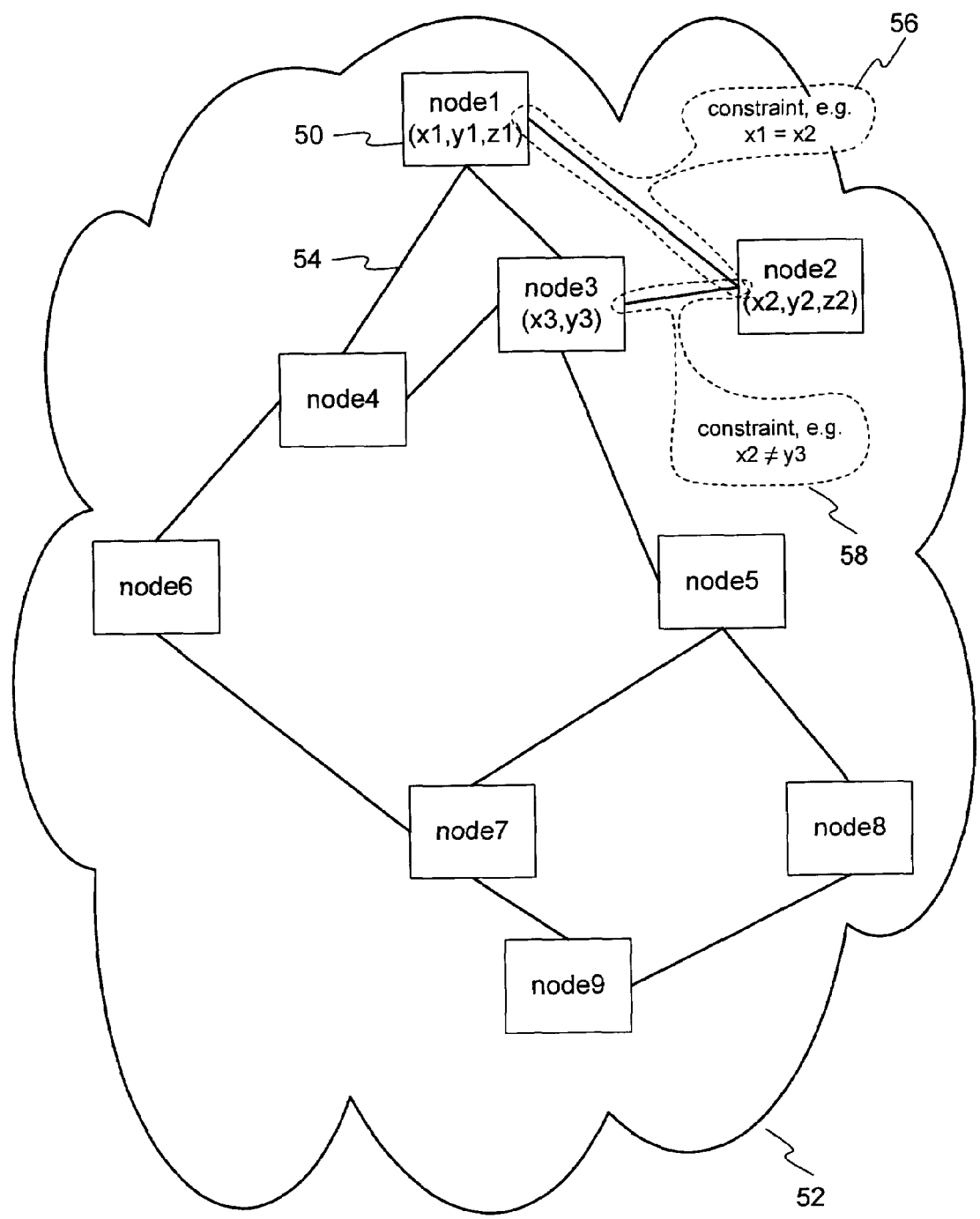
FIG. 1 shows how a distributed constraint problem can be modeled.
Figure 2:
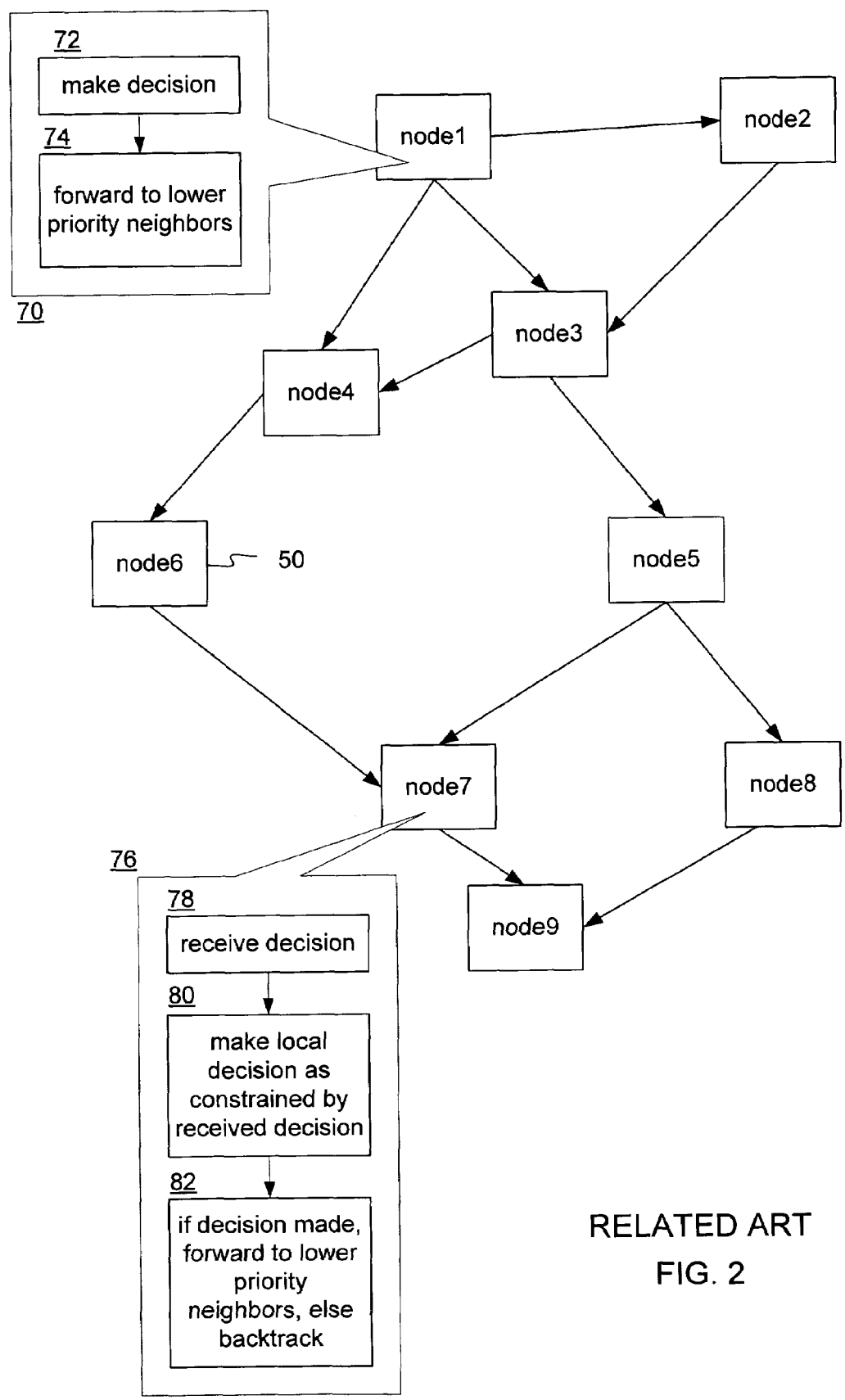
FIG. 2 shows a technique for searching nodes to solve a distributed constraint problem.
Figure 3:
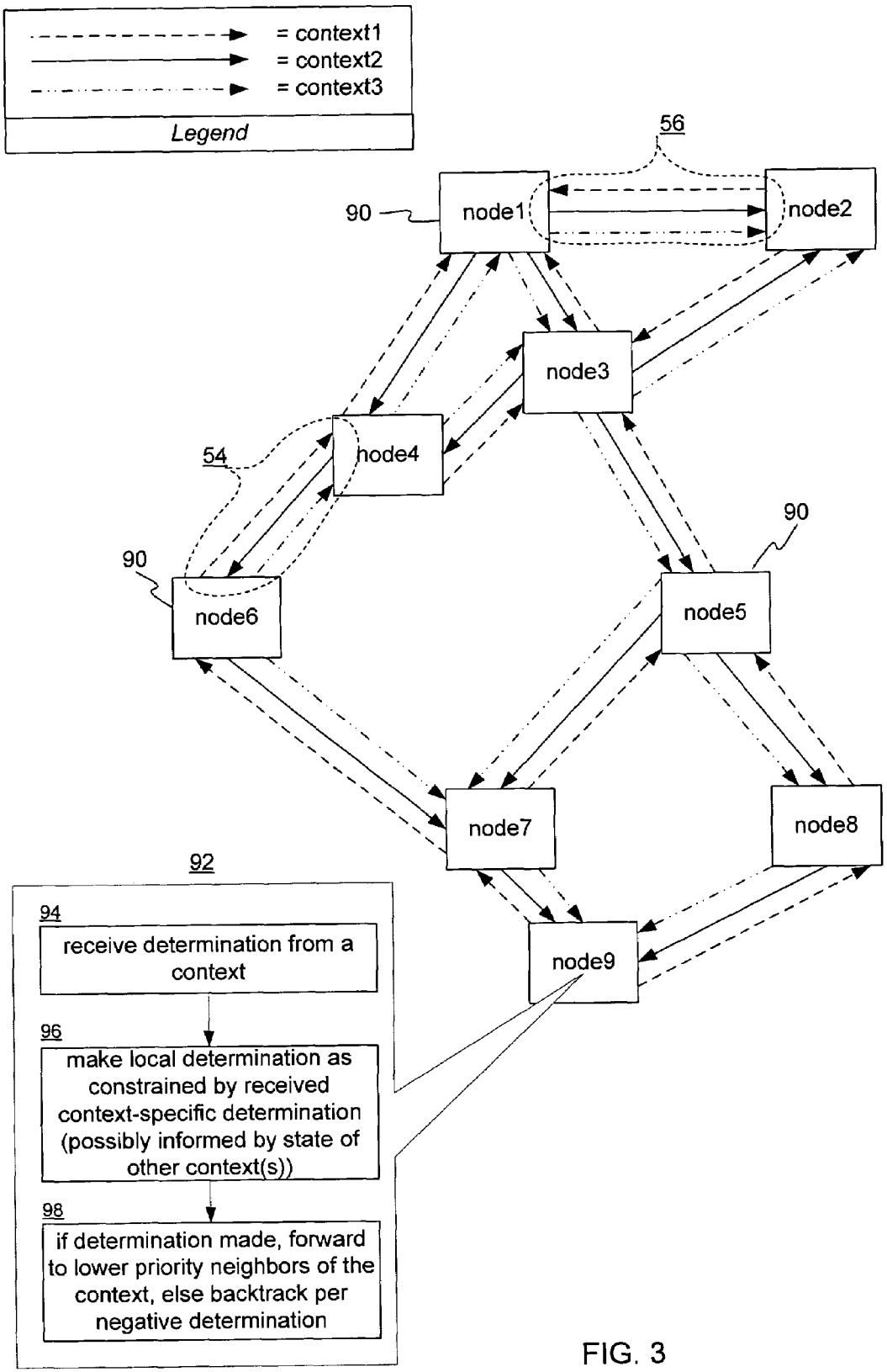
FIG. 3 shows a distributed constraint search system where multiple concurrent searches are performed for multiple concurrent orderings or contexts of a distributed constraint problem.

FIG. 3 shows a distributed constraint search system where multiple concurrent searches are performed for multiple concurrent orderings or contexts of a same distributed constraint problem. A communication medium 52 as in FIG. 1 is assumed and not shown. A multi-context system as in FIG. 3 has nodes 90 and constraints 54. As will become apparent, the nodes 90 differ from the nodes 50 in FIGS. 1 and 2. As mentioned above in the Background, there are a number of different existing techniques for searching a single ordering of mutually constrained nodes. The techniques discussed with reference to FIGS. 3-7 use a framework within which any current or future distributed constraint search algorithms may be applied. For example, any form of backtracking may be used including backtracking with feedback, weak commitment backtracking, and so on. A same node may use one distributed constraint search algorithm for one ordering or context, and another distributed constraint search algorithm for another concurrent ordering. In another embodiment, the same search algorithm may be used for each ordering. Furthermore, any types of decision making processes or optimization calculations may be used within the nodes of the framework.

In the example shown in FIG. 3, there are three different concurrent search contexts, each represented by a different line appearance. This multi-context framework can be an extension of or provided for any existing distributed constraint search algorithm. Each context has a different ordering of the nodes. As mentioned previously, in a distributed constraint system, a constraint between two nodes is mutual and its satisfaction does not depend on which node makes a determination first. For instance, if variable x1 at node1 must be equal to variable x2 at node2, both nodes must satisfy the same constraint. Although the particular priority ordering of mutually constrained nodes can significantly impact how quickly a search finds a solution or how long it takes to determine that there is no solution, searches of different orderings may nonetheless produce global solutions that satisfy all of the constraints between the nodes.

Referring again to FIG. 3, it can be seen that there are three different orderings of nodes (two or more orderings will suffice). The first ordering or context, context1, is depicted by dashed arrows. Context1 starts at node9 and ends at node1. The second ordering, context2, is depicted by solid arrows. Context2 starts at node1 and ends at node 9. The third ordering, context3, is depicted by dash-dot arrows. Context3 starts at node6 and ends at node2. In each context, all of the inter-node constraints 54/56/58 exist and are the same in each context, but the part of a constraint that is determined first (e.g. x1 of node1, or x2 of node2) can differ, depending on the context. For example, in context1 node1 follows the decision or determination of node2, and in context2 node2 follows the determination of node1. If, as in the example of FIG. 1, the constraint between node1 and node2 is that node1's variable x1 must be equal to node2's variable x2, then in context1 node1 will receive from node2 a value that x1 is constrained to, and node1 will then attempt to make its determination accordingly. The order is reversed in context2; node2 will attempt to make its determination assuming a value for x2 as constrained by node1.

Each node has a context-sensitive search process 92. A node receives 94 a determination (e.g. a decision or a value assignment) from another node. The received 94 determination corresponds to one of the orderings or contexts. The node makes a local determination 96 as constrained by the received 94 determination. The determination 96 is a local process possibly involving internal constraints and information private to the subject node. As discussed in more detail with reference to FIGS. 6 and 7, in one embodiment the local determination 96 can take into account the state of a context other than the received message's context. If 98 a determination 96 is possible, then it is forwarded to the one or more nodes that are next in priority for the context of the received 94 external determination.

As mentioned above, nodes can use any current or future distributed constraint search algorithm to search an ordering or context. For example, a simple backtracking algorithm may be used for a first context, and a backtracking algorithm using feedback may be used for a second context. This will be discussed later with reference to FIG. 4.

Any number of different mechanisms may be used to allow a node 90 to determine which context a received 94 determination corresponds to. In one embodiment, messages exchanged between nodes 90 include a flag indicating the relevant context. In another embodiment the nodes use different communication channels for each context. For example, each context may have its own pre-determined TCP port number, in which case any message received on a port will be assumed to correspond to the port's pre-determined context.

Figure 4:
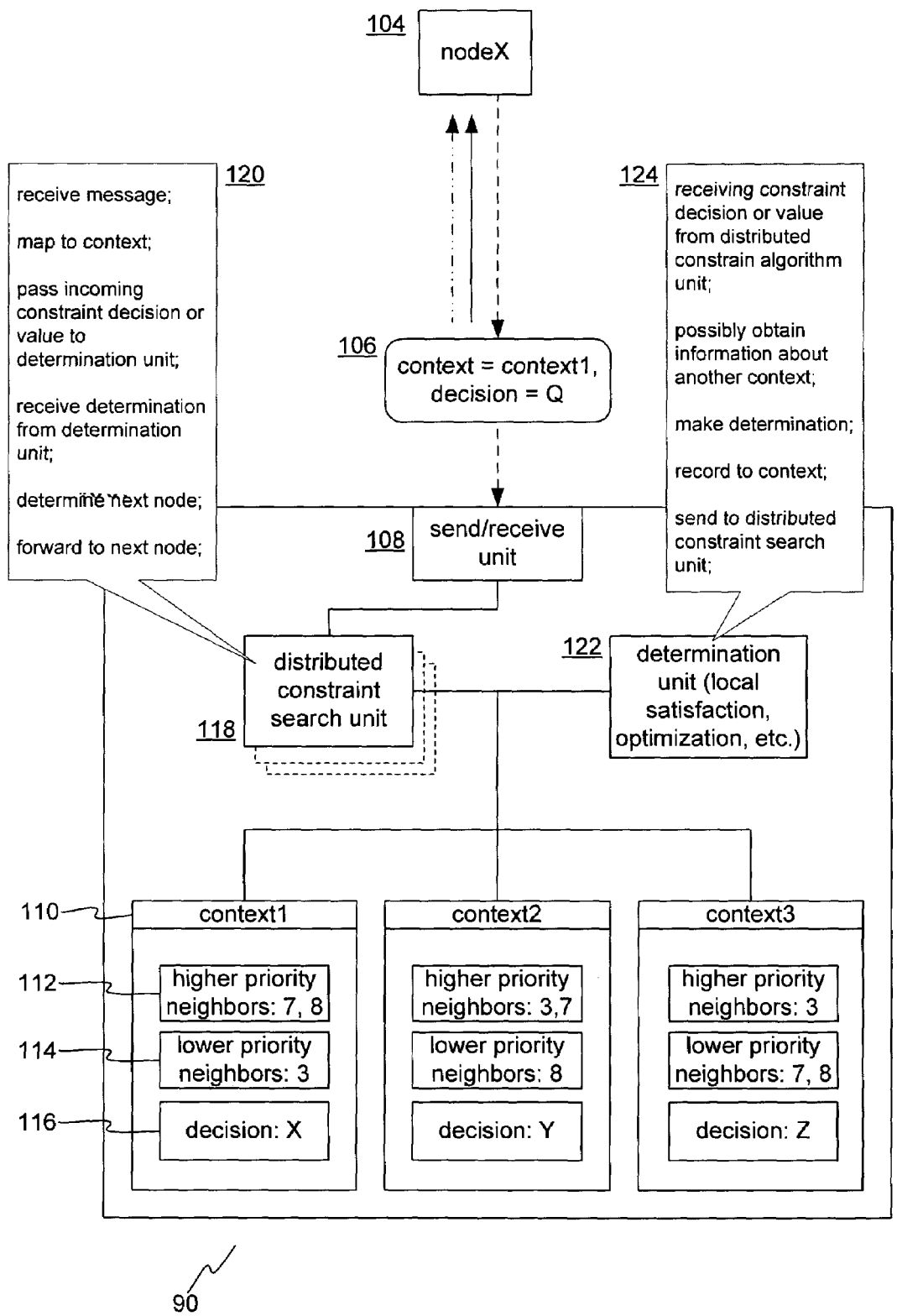
FIG. 4 shows a node with one possible configuration for multi-context distributed constraint searching.

FIG. 4 shows a node 90 with one possible configuration for multi-context distributed constraint searching. Node 90 exchanges messages 106 with other nodes 104 via the communication medium 52 and a send/receive unit 108, which may be a network interface and associated communication protocol stacks, a bus interface, and so on.

In the example of FIG. 4, node 90 has context information 110 for each context. This may include the identity of higher priority neighbors 112 and lower priority neighbors 113. Although it is convenient to maintain neighbor information 112 and 113 locally within node 90, it is also possible to carry this information in each inter-node message. That is, each determination or constraint message passed from some nodeX to some other nodeY can contain information describing the entire ordering to which the message corresponds. In this embodiment, node 90 may not need to maintain neighbor information 112 and 114. This embodiment can also facilitate weak-commitment search or some other form of dynamic reordering of a context.

The context information 110 may include context state information 116. Context state information is any information about the state of a context. This may include information such as the decision or determination that node 90 made in a given context. The context state information 116 may include other information such as the number of backtracks that have occurred in a context upstream from the node, the constrained values of other nodes, communication overhead statistics, etc. In one embodiment the context state information 116 can be used to facilitate aggregated determinations 96. Aggregated determinations are local determinations 96 (e.g. local decisions, local optimization values, etc.) that take into account the state of one or more contexts other than that to which the current determination 96 corresponds. Aggregated determinations 96 are discussed in detail later.

Node 90 is also provided with one or more distributed constraint search units 118. A search unit 118 provides logic for performing a distributed constraint search. A search unit 118 may perform a process such as process 120 shown in FIG. 4. In process 120, the search unit 118 receives a determination or constraint message from an upstream node. The message is mapped to a context. The incoming determination is passed to determination unit 122. A local determination is received from the determination unit 122, and the previously identified context is used to determine the next node in that context. The identity or address of the next node can come from lower or higher priority neighbor information 112 or 114, based on the identified current context. If the determination unit 122 cannot meet the requirements of node 90 (as constrained per content in message 106), then the higher priority neighbor information 112 can be used to return a failure or rejection message to the upstream node(s). If the determination unit 122 was successful, then the local determination is forwarded to the one or more nodes that are next in priority for the current context, as indicated in the lower priority neighbor information 114. Again, neighbor information can be obtained in other ways, for example, neighbor information can be obtained from an inter-node message such as message 106, which may contain the entire ordering of nodes for the context to which it corresponds.

Each node can use the same basic search process 120 for a same search context. For example, each node can use a same no-feedback backtracking process for determinations made in context1, and a same feedback backtracking process for determinations made in context2. As mentioned previously, it is also possible to have only one search process 120 in each node, in which case each different context or ordering is searched in a different order using the same distributed constraint search algorithm.

The determination unit 122 is unlimited in the types of determinations it makes; any type of local satisfaction determination or optimization determination can be used (which will be a part or a sub-problem of a global satisfaction problem or global optimization problem). The determination unit 122 performs a process 124 of: receiving an external determination (a decision or value) from the search unit 118; optionally obtaining information about a context other than the current one; making a local determination such as a decision or optimization that satisfies or conforms to the external determination received from the search unit 118 as well as any local or private requirements (either of which may be based on the information about another context); recording the determination in association with the current context (e.g., writing it to context state information 116); and sending it to the distributed constraint search unit 118 (which forwards it to the node(s) that it determines to be next in the current context).

Figure 5:
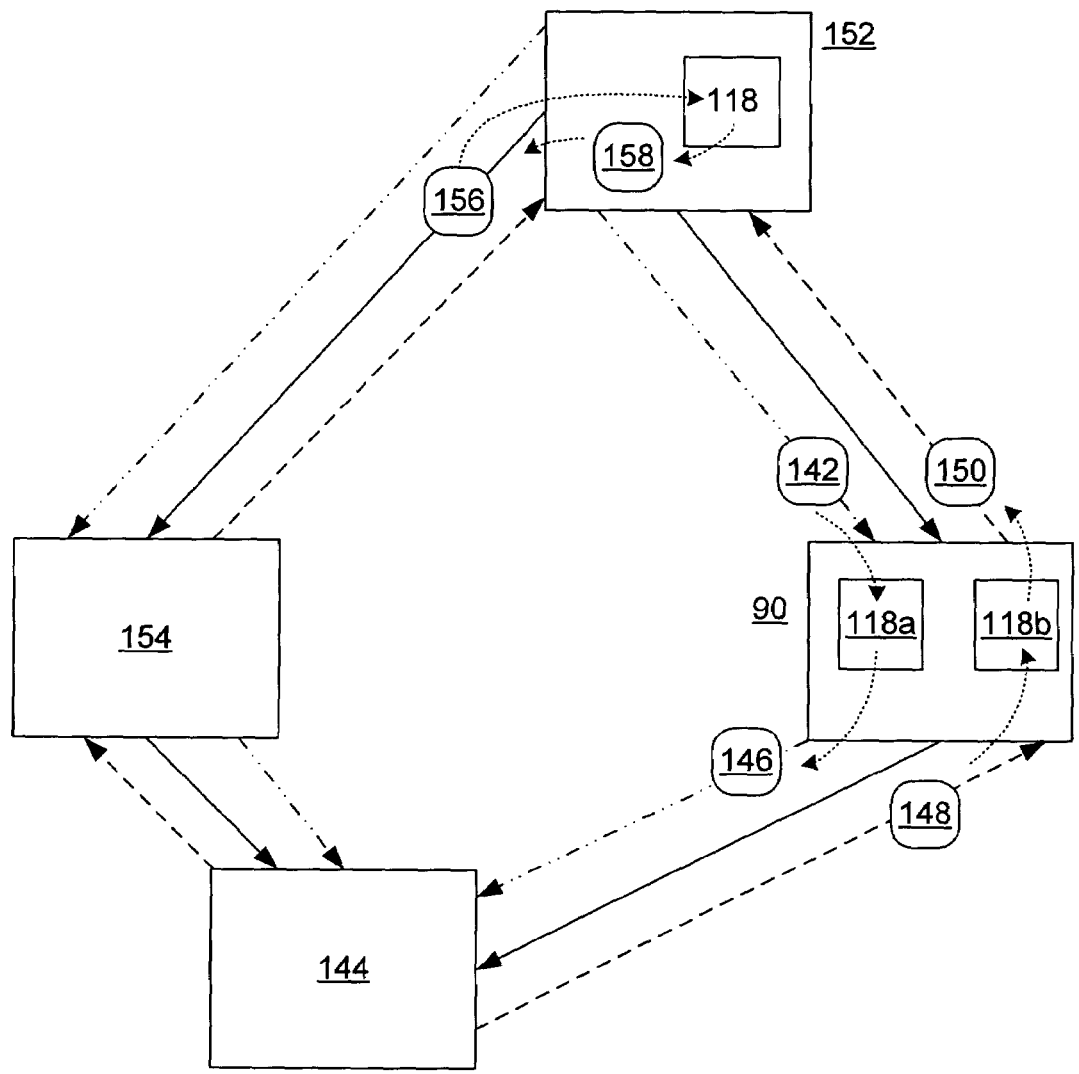
FIG. 5 shows nodes handling context-specific messages.

FIG. 5 shows nodes handling context-specific messages. Node 90 receives a determination message 142 that corresponds to context3. The message 142 contains a value or decision (e.g., of a variable) that constrains node 140 in context3. After node 90's determination unit 122 makes a determination, optimization calculation, satisfaction decision, etc. in accordance with the determination in message 142, node 90 sends a message to that effect to the relevant ordering or context, in this case, context3. More specifically, node 90's search unit 118*a* determines that node 144 is next in priority for context3. The search unit 118*a* sends a message 146 to node 144. Message 146 indicates node 90's determination, which constrains node 144's determination, and so on.

FIG. 5 also shows node 90 receiving a determination message 148 from node 144 in context1. In context1, node 144 has higher priority than node 90. Message 148 (context1) might be received and handled at any time before or after message 142 (context3) is received and handled. The relative timing of receiving determination messages will depend on the progression of the searches in the corresponding orderings or contexts. Determination message 148 is processed in a manner similar to determination message 142. A different search unit 118*b* implementing a distributed constraint search algorithm other than that of search unit 118*a* forwards node 90's context3 determination, in the form of determination message 150. The search unit 118*b* sends the determination message 150 to node 152 based on the context of the determination; in context3, node 152 follows node 90. It should be noted that only one search unit 118/118*a*/118*b* is needed. Nodes can use the same search algorithm for each different ordering of nodes.

In some cases a node will not be able to comply with a constraint imposed by an upstream node, and when a node determines which node to send a determination message to (a message with a determination that the constraint cannot be accommodated), that node could be a higher priority node in the relevant context or ordering. In FIG. 5, node 152 receives from node 154 a determination message 156 that carries a determination made by node 152 within context2. Node 152 needs to make its determination as constrained by node 154's determination. However, when node 152 determines that it cannot find its own optimal value or satisfy its own requirements and at the same time comply with node 154's determination, node 152 sends a determination message 158 to that effect to the relevant ordering or context. More specifically, node 152 sends determination message 158 to node 154, which is the upstream node for the context of determination message 158.

Figure 6:
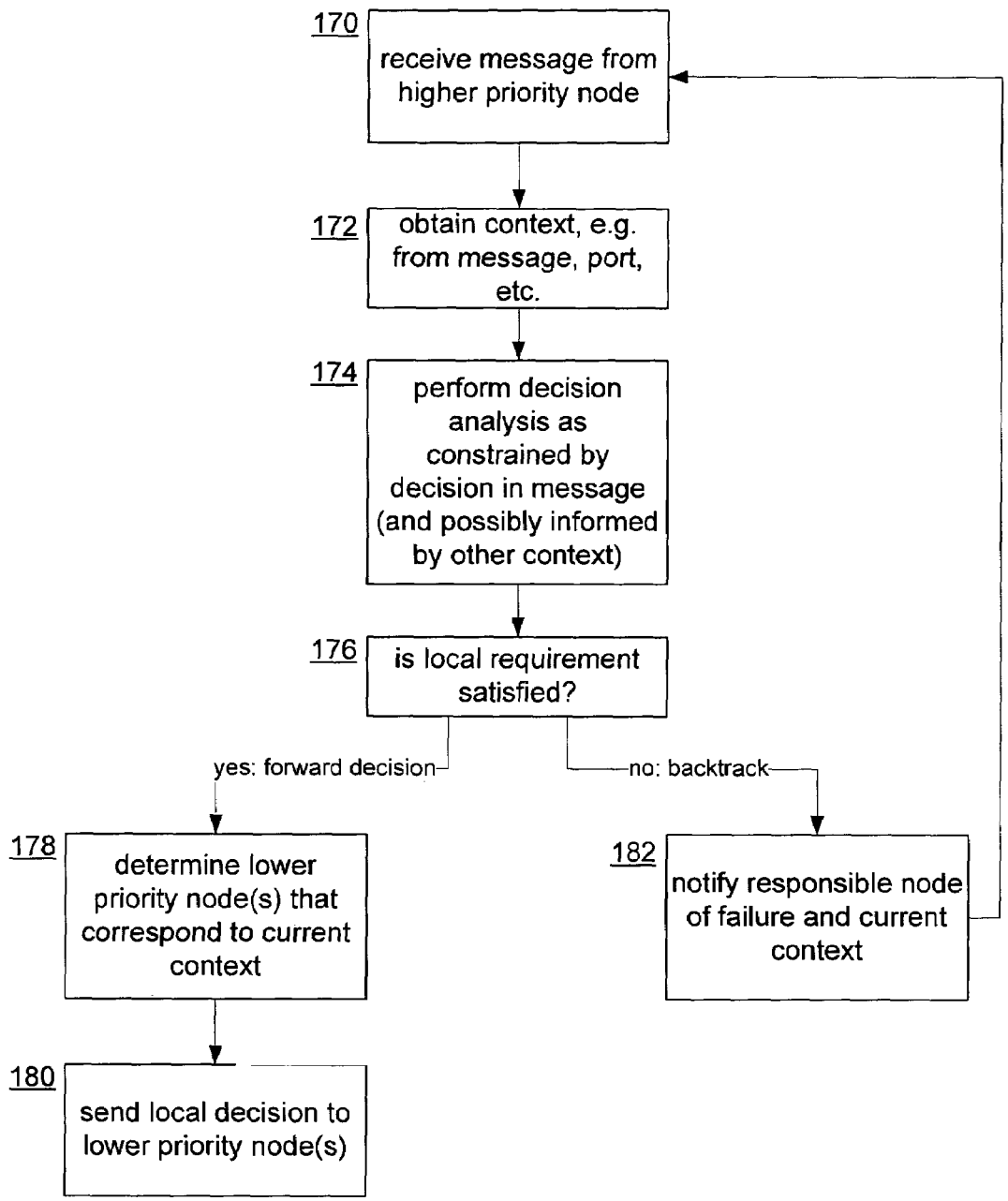
FIG. 6 shows a process performable by a node participating in a multi-ordered system of distributed constraints.

FIG. 6 shows a process performable by a node participating in a multi-ordered system of distributed constraints. The particular node configuration discussed above with reference to FIG. 4 is not necessary to accomplish concurrent searches of different orderings. FIG. 6 shows a process by which a node of any configuration can participate in concurrent multi-ordered searches of a network of distributed constraints.

A node receives 170 a message from a higher priority node in one of the node orderings that is being searched. The received 170 message contains an indication of a determination or decision of the upstream node that sent the message. The receiving node obtains 172 the identity of the ordering or context to which the received 170 message corresponds. The node then performs 174 local decision analysis as constrained by the decision or determination indicated by the received 170 message. In other words, the node attempts to satisfy its own requirements in view of the upstream outcome indicated by the received 170 message. If the local requirement is satisfied 176 then the node forwards its decision, which it accomplishes by determining 178 one or more nodes that are next in the ordering of the obtained 172 context and sending 180 the local decision (from step 174) to those next nodes. However, if the local requirement is not satisfied 176 then the node notifies 182 a culprit or responsible node that its determination or decision could not be complied with. In this case of failure, the parent node whose constraint is responsible for the failure is preferably identified by doing an analysis of the current failure. Moreover, in some circumstances, such as when at the top of an ordering or hierarchy, it is possible that no such culprit or responsible node can be identified. In these cases, the problem is shown or assumed to be insoluble.

Whether transmitting a notice of failure (step 182) or transmitting a successful local decision (step 180), the node may include in its transmission an indication of the relevant context, but this may not be needed if the mode of inter-node communication allows a neighbor node of the relevant context to be inferred.

In embodiments using the process in FIG. 6, a node can perform the same context-sensitive search process to send/receive messages that correspond to different search contexts. In other words, messages for different contexts can be handled in a similar manner but the node that a local determination (including a failure determination) is addressed to will depend on the context or ordering of the received 170 message (external determination) that actuated and constrained the local determination. Furthermore, each node uses its same local determination process (e.g. decision making, optimization, etc.). The result is that two or more orderings or prioritizations can be used to find a global solution to the same distributed constraint problem.

Figure 7:
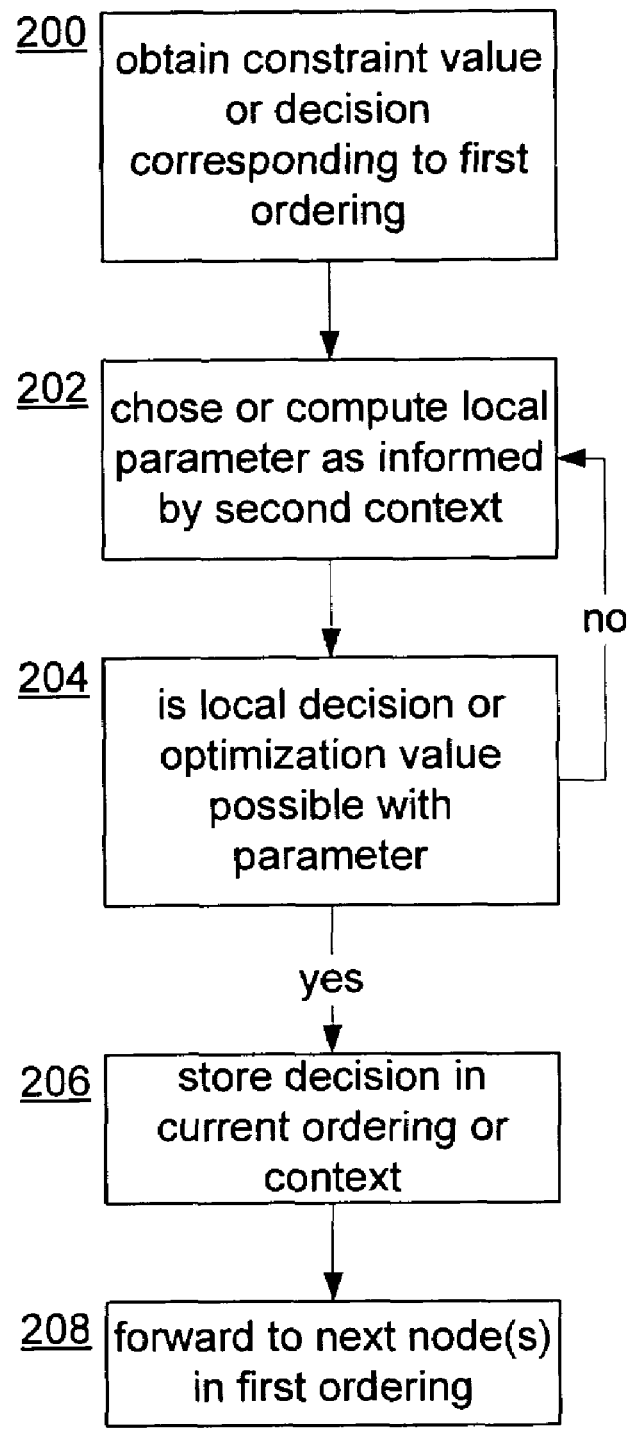
FIG. 7 shows a search and determination process that allows a node to use information about one context to inform a determination made in another context.

FIG. 7 shows a search and determination process that allows a node to use information about one context to inform a determination made in another context. In similar fashion as discussed above, a node obtains 200 from a neighbor node a constraint value or decision that corresponds to a first ordering of nodes. The subject node chooses or computes 202 a local parameter as informed by a second context. This can be performed in any number of ways. The local node may use a recorded (see process 124) constrained determination made for the second context as a basis for choosing a local parameter. If the local node is the example node shown in FIG. 4, then the node may use a diversification strategy and chose decision X for context1 because it differs from decision Y made in context2. Other strategies may be used. For instance, a node may track the number of backtracks (upstream, downstream, or both) associated with a particular choice or value for one context and chose values that are known to cause less backtracking. In any case, the local node uses the informed parameter to attempt to satisfy or solve its local problem. If the local problem is not 204 possible then another local parameter may be chosen or computed 202, and so on, until the local problem can be solved. If a number of failures at step 204 reaches a threshold, perhaps as low as one, the local node can end the determination process and return a message rejecting the constraint obtained 200 from another node. If the local problem is solved 204, then the node stores the local determination (or other information relation relevant to the determination) and forwards 208 its determination to the next node in the first ordering.

Globally, concurrent searches of different orderings of a distributed constraint problem should not need to be synchronized; each search may proceed at its own pace independent of the searches in other contexts. Furthermore, each search may proceed asynchronously, with a node possibly starting a search for a local solution before becoming aware of a parent node's decision. At least in the case where the distributed constraint problem is of the satisfaction variety, it is preferable that the termination of a search in one context, whether due to successful completion or a conclusion that a solution to the distributed constraint problem is not possible, cuts off the searching in any other contexts. This is due to the fact that a satisfaction problem usually is concerned with a global "yes or no" decision. Search termination can be done by propagating a termination message across the node network or by sending a message to a director node that in response notifies all of the nodes.

Furthermore, although the general techniques discussed herein are applicable to both satisfaction problems and optimization problems, some additional steps may be needed for optimization embodiments. For example, a node may need to know the current values determined by the upstream nodes in order to determine how potential local values affect a global cost function. Nonetheless, although optimization implementations are more complicated than satisfaction implementations, the basic ideas of using different concurrent orderings and using information about one or more orderings to inform a determination ordering are still applicable, and any current or future constrained optimization search algorithms may be used.

Some empirical results and recommendations follow. Experimentation has shown that multi-ordered searching can improve searching by an order of magnitude under many different conditions. After running many simulations with large distributed constraint problems, it was found that from 2 to 20 contexts is practical. There is a point where too many contexts results in excessive overhead, due to excessive message passing, increased local computing, etc. In looking for a balanced tradeoff between efficiency and overhead, it was found that for a number of different problem classes, between 5 and 10 contexts resulted in optimal performance increases over single-context approaches. These results are based on simulations of real world problems, with estimates being provided for communication costs, local computation costs, etc.

Different ordering approaches were tested. However, it was discovered that clever or sophisticated orderings are not needed; as long as the orderings are different the results will be useful. Even two contexts with one small difference will be an improvement over results using classic techniques. Nonetheless, different strategies for orderings may be used and may be significant for some current or future search algorithms. One successful approach for ordering is to use a reasonable ordering algorithm, for example putting the most constrained decision node on top, and have the other orderings be random or derived using different techniques.

Different aggregation policies were also tested, again with mixed results. However, some of the following aggregation strategies may be beneficial in some cases. For each context the number of backtracks can be counted. If the number is high the context is deemed poor and decisions or determinations are made that are different from that context. However, a context can have high local backtracking but low overall backtracking. Another approach is to select a value which is used the most or the least in another context. Another aggregation approach is to select a value that maximizes the compatibility over all the decision centers.

In conclusion, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like. Furthermore, those skilled in the art will also appreciate that no further explanation is needed for embodiments discussed herein to be implemented on devices other than computers. Devices such as appliances, televisions, portable media players, robots, smart sensors, and others, can be readily designed with features discussed above.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

Those skilled in the art will also realize that a variety of well-known types of computing devices (or devices with network and computational ability) can serve as a node in a distributed constraint network. For example servers, workstations, personal computers, PDAs, mobile devices, network devices, routers, gateways, logic built into any type of device such as a sensor, and so on. A node can take the form of any type of computation-capable device. Such systems and their typical components including CPUs, memory, storage devices, network interfaces, operating systems, application programs, etc. are well known and detailed description thereof is unnecessary and omitted. A node can operate using any type of communication medium as discussed above, including a data network such as a TCP/IP network, a wireless telephony network, a telephony signaling network, and others.

The invention claimed is:

1. A method performed by a computing device configured to cooperate with other computing devices to solve a distributed constraint problem, the distributed constraint problem comprising a representation of a real world problem to be solved with a solution to the distributed constraint problem, wherein the real world problem comprises a problem of coordinating or controlling the computing devices to achieve a mutual objective, where the computing device concurrently participates in a first ordering of the computing devices and a second ordering of the computing devices, where the first and second orderings comprise different concurrent orderings of the computing devices, where the method performed by the computing device comprises:

receiving, via a network, a first external constraint determination from the first ordering, using the first external constraint determination to make a first local constraint determination, and sending, via the network, a message regarding the first local constraint determination to the first ordering, the different orderings comprising different pre-determined orders in which the constraint determinations are made and then communicated from one computing device to another; and receiving, via the network, a second external constraint determination from the second ordering, using the second external constraint determination to determine a second local constraint determination, and sending, via the network, a message regarding the second local constraint determination to the second ordering, wherein the constraint determinations in the messages are used to find a global solution for the distributed constraint problem, the solution comprising a set of constraint values that mutually satisfy the distributed constraint problem, the constraint values of the solution corresponding to the computing devices, respectively, wherein the computing devices mutually solve the real world problem by operating according to their respective constraint values.

2. A method according to claim 1, wherein the computing device uses a same distributed search algorithm to both send the first local constraint determination to the first ordering and to send the second local constraint determination to the second ordering.

3. A method according to claim 1, wherein first local constraint determination comprises either a satisfaction determination or an optimization determination.

4. A method according to claim 1, further comprising, when the computing device determines that a global solution for the first ordering is possible or is not possible, the computing device sends a message to the second ordering that terminates searching in the second ordering.

5. A method according to claim 1, wherein the second local constraint is determination is determined based on a determination made with respect to the first ordering.

6. A method according to claim 1, wherein the first local constraint determination comprises a determination that the computing device cannot comply with the first external constraint determination and the message regarding the first local constraint determination comprises a backtrack message addressed to a higher priority computing device in the first ordering.

7. A method according to claim 1, wherein the computing device directs the first local constraint determination to another computing device based on the order of the computing device in the first ordering.

8. A device configured to be capable of performing a process for participating as a device in a system of network-connected devices configured to solve a distributed constraint problem that comprises mutually constrained sub-problems of respective devices, the distributed constraint problem comprising a representation of a real world problem to be solved with a solution to the distributed constraint problem, wherein the real world problem comprises a problem of coordinating or controlling the devices to achieve a mutual objective, the process comprising:

receiving, via the network, from neighbor device, values or decisions that allow the sub-problems of the neighbor devices to be solved, where some received values or decisions correspond to a first ordering of the devices, and where some received values or decisions correspond to a second ordering of the devices;

performing attempts to solve the sub-problem of the device as constrained by the values or decisions of the neighbor nodes; and via the network, communicating results of the attempts to neighbor devices, where for a given value or decision the device to which the corresponding attempt result is communicated depends on which of the orderings the given value or decision corresponds to, the different orderings comprising different pre-determined orders in which the devices attempt to solve their respective sub-problems and communicate values or decisions thereof, wherein the constraint determinations in the messages are used to find a global solution for the distributed constraint problem, the solution comprising a set of constraint values that mutually satisfy the distributed constraint problem, the constraint values of the solution corresponding to the devices, respectively, wherein the devices can mutually solve the real world problem by operating according to their respective constraint values.

9. A device according to claim 8, where an attempt result corresponding to the first ordering informs an attempt to solve the sub-problem of the device as constrained by a value or decision that corresponds to the second ordering.

10. A device according to claim 8, wherein the distributed constraint problem comprises a distributed constraint optimization problem, wherein the sub-problems comprise respective parts of the optimization problem, and wherein the receiving comprises receiving values from neighbor devices.

11. A device according to claim 8, wherein a result of an attempt for a given received value or decision comprises a value or decision that solves the device's sub-problem.

12. A device according to claim 8, wherein a result of an attempt for a given received value or decision comprises a notice indicating that the device could not solve its sub-problem as constrained by the given received value or decision.

13. A device according to claim 8, wherein the device is configured to communicate with other devices via a data network.

14. device according to claim 8, wherein steps performed by the device allow it to participate a first search that is a search of the first and a second search that is a search of the second ordering, where the first and second search are concurrent, where the first search is performed with a first distributed constraint search algorithm, and where the second search is performed with a second distributed constraint search algorithm.

15. A volatile or non-volatile device-readable medium storing information to allow a computing device to perform a method for participating in a network of similarly configured computing devices having mutually distributed constraints, the mutually distributed constraints comprising a representation of a real world problem to be solved with a solution thereof, wherein the real world problem comprises a problem of coordinating or controlling the computing devices to achieve a mutual objective, the network having a plurality of concurrent different orderings, the method comprising:

receiving from the network a first message indicating a first value of a variable to which the computing device is constrained, the first value corresponding to one of the orderings;

in accordance with the first value, determining a value of a local variable that constrains the network; and sending to the network a second message indicating the value of the local variable, where the node assures that the second message is sent in accordance with the ordering to which the first value corresponds, wherein the different orderings comprising different pre-determined orders in which the computing devices determine values of local variables and communicate same from one computing device to another.

16. A volatile or non-volatile device-readable medium according to claim 15, where the method further comprises:
receiving from the network a second message indicating a second value of the variable to which the computing device is constrained, where that second value corresponds to an ordering other than the ordering that corresponds to the first value, and where the computing device assures that an indication of the second value is sent to the network in accordance with the ordering of the second value.

17. A volatile or non-volatile device-readable medium according to claim 15, wherein the value of the local variable is determined based on information about an ordering other than the ordering that corresponds to the first value.

18. A volatile or non-volatile device-readable medium according to claim 15, wherein the method further comprises causing the network to backtrack when the determining a value of the local variable fails, where the backtracking is in accordance with the ordering to which the first value corresponds.

19. A volatile or non-volatile device-readable medium according to claim 15, wherein the method further comprises determining which ordering the first value corresponds to based on the first message.

20. A volatile or non-volatile device-readable medium according to claim 15, wherein the first value and the value of the local variable are part of a solution to the network of distributed constraints.

* * * * *